J. H. BAMBERG.
CASTING AND PROCESS OF MAKING SAME.
APPLICATION FILED MAR. 7, 1916.

1,296,589.

Patented Mar. 4, 1919.
5 SHEETS—SHEET 1.

J. H. BAMBERG.
CASTING AND PROCESS OF MAKING SAME.
APPLICATION FILED MAR. 7, 1916.

1,296,589.

Patented Mar. 4, 1919.
5 SHEETS—SHEET 3.

Witness
Edwin L. Bradford

Inventor
Joseph H. Bamberg,
By
Edward R. Alexander
Attorney

J. H. BAMBERG.
CASTING AND PROCESS OF MAKING SAME.
APPLICATION FILED MAR. 7, 1916.

1,296,589.

Patented Mar. 4, 1919.
5 SHEETS—SHEET 5.

Witness
Edwin L. Bradford

Inventor
Joseph H. Bamberg,
By Edward R. Alexander
Attorney

UNITED STATES PATENT OFFICE.

JOSEPH H. BAMBERG, OF TONAWANDA, NEW YORK, ASSIGNOR TO THE ALUMINUM CASTINGS COMPANY, OF CLEVELAND, OHIO, A CORPORATION OF OHIO.

CASTING AND PROCESS OF MAKING SAME.

1,296,589. Specification of Letters Patent. Patented Mar. 4, 1919.

Application filed March 7, 1916. Serial No. 82,529.

*To all whom it may concern:*

Be it known that I, JOSEPH H. BAMBERG, a citizen of the United States, residing at Tonawanda, in the county of Erie and State of New York, have invented certain new and useful Improvements in and Relating to Castings and Processes of Making Same, of which the following is a specification.

This invention relates to a process of making castings, more particularly castings having hollow sections with internally projecting bosses, webs, ribs and extensions, or either of them, and the product resulting from said process.

While of more general application in many of its aspects, the invention has in view and is adapted to the production of skirted pistons, such as are used in internal combustion motors.

One of the objects of this invention is to provide a process of making castings of metal or metallic alloy of relatively low specific gravity, in which, preferably, the metal is poured into the mold under atmospheric conditions and flows into the mold cavity under gravity action and in which the resulting castings are relatively non-porous, free from entrapped air and other gases, and oxids and other foreign materials and are capable of easy machining to provide efficient and durable bearing surfaces.

Another object of the invention is to provide a process especially adapted to the making of a casting having a hollow section with relatively thin walls and internally extending bosses, ribs or projections, or either of them, such as a cast skirted piston for internal combustion engines, wherein the parts forming a mold cavity may be rapidly and easily separated from the casting and their temperatures controlled to regulate, as desired, the times during which they are to contact with the casting and to produce different internal structural characteristics in different parts of the casting.

A further object of the invention is to provide an improved process of producing relatively light weight piston castings from aluminum alloys, or other metallic alloys of light weight and high heat conductivity, which piston castings shall be substantially non-porous, with various parts having different internal structural characteristics as desired and composed in their entirety of a minimum volume of metal and which, when finished and used within the cylinders of internal combustion engines, will not collect carbon to the same extent as do iron pistons and will, because of their fine grained structure, take and retain a relatively high polish.

Another object of the invention is to provide a process of casting in permanent sectional molds skirted pistons of metal or metallic alloy of relatively low specific gravity, whereby the said castings can be produced more rapidly and cheaply, of greater uniformity, and requiring less volume of metal than has heretofore been possible.

Another object of this invention is to provide a process of making piston castings for internal combustion motor pistons from an alloy of aluminum and magnesium, or either of them, containing copper, tin, zinc, iron, manganese, titanium, nickel and silicon, or either or any of them, and in which the resulting structure will be relatively fine-grained, non-porous and free from entrapped air and other gases and from oxids and other foreign materials.

Another object of my invention is to provide a process of making piston castings for internal combustion motors using metallic alloy of relatively low specific gravity and high coefficient of heat conductivity and in which there will be a relatively small amount of eutectic substantially surrounding the excess substance in the casting in a manner to provide efficient and durable machined bearing surfaces.

Another object of my invention is to provide a process of making piston castings for internal combustion motors using a metallic alloy of relatively low specific gravity and high heat conductivity and causing (a) the casting to set progressively within the mold cavity, while maintaining the portions of the freezing metal within the mold cavity which are still liquid in communication with a source of liquid metal outside the mold cavity to produce a non-porous structure, and (b) the setting to take place with sufficient rapidity to produce a relatively fine-grained structure.

Other objects of my invention are to provide a skirted piston casting of metal or metallic alloy of relatively low specific gravity and a relatively high coefficient of heat conductivity and which piston is comparatively non-porous and free from entrapped air and other gases and oxids and other foreign materials, and has different internal structural characteristics at different sections as desired, which, when machined and used in the cylinder of an internal combustion motor, will not collect carbon as readily as an iron piston and will take and retain a relatively high polish because of its fine-grained structure, and which will not disintegrate under ordinary usage in an internal combustion motor.

Another object of my invention is to provide a skirted piston casting made of a metallic alloy of relatively low specific gravity and high heat conductivity and in which casting there is a relatively small amount of eutectic which substantially surrounds the excess substance in the casting in a manner to provide efficient and durable machined bearing surfaces.

Another object of this invention is to provide a piston casting of an alloy of aluminum and other elements such as magnesium, copper and iron, having a structure relatively fine-grained, non-porous and free from entrapped air and other gases and from oxids and other foreign materials.

Other objects of my invention will be obvious to one skilled in the art from the description of it hereinafter given.

I prefer to carry out my invention by first assembling the necessary parts of a mold, all of which preferably are made of metal to provide chilling or setting surfaces, including core sections, to shape a mold cavity which will form a piston casting having a head and a cylindrical portion and also preferably internally extending hollow wrist pin bosses. It will be understood that the walls of the mold cavity should be suitably coated or treated in any well known manner, to insure proper setting of the metal poured into the mold cavity and easy and rapid separation of the casting from said walls. Each metal core section for a wrist pin boss should be movable bodily toward and from the axis of the mold cavity in which the cylindrical section of the piston is formed to permit its insertion into the mold cavity and withdrawal from the casting by bodily endwise movement at an angle to said axis. The core for the cylindrical portion of the piston should be made in three or more parts or sections slidably correlated, one of which is centrally disposed relative to the others and freely movable into and out of the mold by bodily endwise movement along the axis of the mold cavity, whereas some or all of the other parts should be recessed to receive the inner end of one of the core sections for the wrist pin bosses and should be movable, (1) bodily laterally relative to the axis of the mold cavity until it is free from the adjacent wrist pin boss, and (2) bodily endwise along the axis of the mold cavity, until withdrawn therefrom.

I have found it advisable to heat and maintain heated the parts of the mold which form the mold cavity. The core sections for the internally projecting bosses preferably are maintained at a lower temperature than the other walls for the mold cavity so as to cause the metal for the wrist pin bosses to set relatively rapidly. I have found, for example, about 300 degrees Fahrenheit to be suitable for this purpose when using an aluminum alloy, containing magnesium, copper and iron. The other walls of the mold cavity may be heated as high as 1100 degrees Fahrenheit to advantage depending upon the nature of the alloy, temperature of the molten metal poured, the resulting internal structure desired, and size and shape of the casting to be made. It will be understood that the respective core sections can readily be maintained at temperatures differing from each other and from the temperatures of the other parts of the mold, by reason of the fact that the core parts are periodically removed from the mold and while removed can be subjected to any suitable temperature conditions; as, for example, to the cooling action of water or the atmosphere, or to the mild heat of a torch or furnace.

Next, I cause suitable molten metal to enter the mold cavity. Preferably I pour the molten metal by hand and cause it to flow into and fill the mold cavity under the action of gravity. I prefer to have the metal enter at one side of the mold cavity at points substantially equidistant from the internally projecting recesses for the wrist pin bosses, so that it may flow in opposite directions, that is, both clockwise and anti-clockwise, from its point of entrance, to fill the mold cavity from bottom to top, the mold being suitably vented to permit the escape of air and other gases.

The shape of the mold cavity, volume of metal in the walls of the mold cavity, including core sections, temperature of the mold cavity walls and temperature of molten metal poured, should be such that setting of the metal within the casting will take place progressively from points relatively remote from those at which the molten metal enters the mold cavity, and the portions of the metal in the mold cavity remaining liquid should at all times be in communication with a source of liquid metal outside the mold cavity which latter is drawn upon during the freezing of the casting to compensate for any crystallization shrinkage within the casting. In other words, during the freezing of the metal in a casting made by my improved process, at substantially no time is liquid metal within the casting isolated from other liquid metal by solid portions. By causing the casting to freeze under these conditions I insure that it will be substantially non-porous because of any cavities in it caused by crystallization shrinkage.

The mold cavity being filled, I next remove the core pins or core sections from the internally projecting hollow bosses by bodily endwise movement, respectively. Next I remove the main core sections. The central one is withdrawn first merely by bodily endwise movement along the axis of the mold cavity. Next I remove the core sections into which extend the hollow inwardly extending bosses on the casting, (1) by lateral bodily movement of each said section and then (2) by outward or longitudinal endwise movement thereof relative to the axis of the mold cavity. Next I separate the remaining parts of the mold so as to free the casting.

In actual practice in making aluminum alloy piston castings I have found it desirable relatively quickly to chill or set the internally projecting hollow bosses by having the core sections or pins which they embrace of the desired temperature to cause the quick chilling or setting of the same. For example, with some piston castings which I have been making by this process, I have found from fifteen to thirty seconds to be a sufficient length of time to leave the core pins for the wrist pin bosses in the mold. I have found it advisable to remove the main core sections in from thirty seconds upwardly, depending upon the design of the casting and the thickness of metal at various sections thereof. One index of the time for removing the main core sections, which may, under certain circumstances, be relied upon, will be the time approximately when the shrinkage due to crystallization losses takes place, for example as indicated by the shrinkage in the gate at such time.

My process is especially adapted for making trunk or skirted pistons from aluminum alloys. Such piston castings should have good bearing qualities and also ample tensile strength to enable them to withstand the heavy stresses to which pistons, especially of internal combustion motors, are subjected in operation. By using aluminum alloys of suitable composition and subjecting them to suitable time-temperature treatment in casting, I have succeeded in producing castings with internal physical structures that insure the desired bearing qualities and strength. Said internal structures are characterized by a relatively small amount of eutectic which substantially, though preferably not entirely, surrounds the excess substance of the alloy. Furthermore, as will hereinafter appear, alloys with eutectic and excess substance thus proportioned and relatively arranged lend themselves admirably, in my improved process, to the elimination of porosity due to crystallization shrinkage.

Satisfactory alloys for the production of such piston castings may contain about eighty per cent. or upward of aluminum, the remaining constituents being iron, titanium, silicon, magnesium, zinc, tin, copper, nickel and manganese, or any of them, as may be found advantageous for the particular piston job having the desired internal structural characteristics. Aluminum alloys which have been found especially suitable for piston castings contain, in addition to the aluminum, copper up to 11.0%, magnesium up to 1.0% and iron up to 1.5%. These alloys may also contain a small amount of silicon which appears as an unavoidable impurity in commercial ingot aluminum.

Such an aluminum alloy containing approximately 10.0% of copper, 1.25% of iron and 0.25% of magnesium I have found to be in a satisfactory molten state for pouring at about 1380 degrees Fahrenheit. At this temperature the alloy will be sufficiently liquid to pour freely and may be caused to flow under the action of gravity into the mold cavity so as to completely fill the same, providing that the temperatures of the walls of the mold cavity are maintained at about the temperatures above indicated.

The sections or parts constituting the walls of the mold cavity should be so shaped and disposed relative to the casting formed in the cavity that, (1) they may be quickly and readily separated therefrom and (2) the separation may take place without undue jarring of the casting; since the freezing range of an alloy of this character is relatively large, and the eutectic is the last portion of the cast structure to freeze, it is essential in producing a sound casting free from cracks and cavities, that jarring should be avoided which would be of a character sufficient to disturb the proper relationship of the eutectic to the excess material and cause cracks or fissures in the casting or poorly knit surfaces.

The piston castings resulting from the carrying out of my improved process, using a metallic alloy having relatively low specific gravity and relatively high coefficient of heat conductivity, for example, an alloy of aluminum, magnesium, iron and copper, such as above referred to, are peculiarly adapted for use in internal combustion motors. Their walls may, if desired, be made relatively thin, so that the piston as an entirety is relatively light. The structure is fine-grained and practically non-porous, the eutectic substantially surrounding the excess material in such manner as to provide a durable and relatively efficient bearing surface without material sacrifice of tensile strength. I have been unable to note any disintegration in the structure of these castings after thousands of miles of severe service in relatively high speed automobile motors of the internal combustion type.

Furthermore, the internal physical structure of the casting characteristic of the above mentioned relation of the eutectic and excess substance is not changed by the working temperatures of the internal combustion motor to which said castings are subjected. These piston castings require relatively little machining in order to prepare them for use inside the cylinder walls of an internal combustion motor. Their structure is finer grained and less porous than the structure of pistons made by any other process of which I have knowledge. Furthermore, the uniformity of product resulting from the process is greater than with any other process known to me. As the connection between the connecting rod and the piston is made through the instrumentality of a wrist pin fitted into the wrist pin bosses, I have found it of particular advantage to have the structure of these bosses that which results from relatively quick setting of the metal in them. As above indicated, the difference in temperature between the molten metallic alloy as it is poured and the temperature at which the core pins for the wrist pin bosses is maintained, is approximately one thousand degrees Fahrenheit.

With respect to the relation of the eutectic and excess substance in my improved castings, I may observe that while the eutectic substantially surrounds the excess substance as stated above, I believe it is desirable that it should not entirely surround and completely isolate said excess substance; for, by avoiding such complete isolation of the excess substance, I believe greater tensile strength is secured.

I believe that progressive setting of the metal in the casting is one of the important factors in reducing porosity, and I have had in mind, in my improved process, to have the setting take place progressively within the mold with that object in view. It is my opinion that when any liquid metal becomes completely surrounded with solid metal, during freezing, its solidification will be accompanied by a contraction of about three to six per cent. of its total volume, porosity accordingly resulting. In my improved process, during the solidification period, the portions of the freezing metal still liquid are in communication with a source of liquid metal without the mold cavity, so that cavities which would normally form in the casting by crystallization shrinkage are filled up.

The existence of an eutectic in a metallic alloy for casting purposes, because of the low melting point of the eutectic, is peculiarly advantageous in reducing the amount of porosity in the casting, particularly where the liquid portions of the freezing metal are in direct communication with other liquid metal, as provided by my improved process, which permits the crystallization shrinkage within the casting to be filled up or taken care of from molten metal without the mold cavity proper. During the freezing of the metal in the casting made by my improved process, at substantially no time is liquid metal within the casting isolated from other liquid metal by solid portions.

It will be understood that the core sections for the wrist pin bosses and the main core sections always should be removed prior to the time when the shrinkage of the metal in the mold cavity upon the core section would make it difficult to remove said section from the casting.

In order to keep the molten metal outside of the mold cavity in proper liquid condition to compensate for shrinkage losses in the mold cavity, the walls containing the gate in which the said outside metal collects may be maintained at a higher temperature than the walls constituting the mold cavity, or the adjacent parts of the mold which form the walls of the mold cavity proper.

Having described the steps of my process, I will now describe ways and means for carrying out those steps and the product resulting therefrom.

In the drawings, 1 indicates as an entirety a permanent mold comprising a series of members constructed to form a casting of the desired shape, such as a skirted or cup-shaped piston for an internal combustion motor. The mold illustrated in the accompanying drawings may be formed from cast iron or other suitable material. It preferably comprises a base member 2, and complementary members 3, 4, movable on the base member 2 toward and from each other. The base member 2 may comprise a platform or base plate $2^a$, the central portion of which is suitably surfaced to form the bottom of the mold cavity A. The base member 2 is by preference mounted on feet or standards $2^b$.

Each of the complementary members 3, 4, may comprise a side wall 5, end walls 6, 7, and top and bottom walls 8 and 9, respectively. These walls may be integrally formed, as shown in the drawings. The walls 6, 7, 8 and 9 of each member project outwardly from the rear face of the wall 5 to form a heating chamber $9^b$, the outer side of which is formed by a plate $9^c$ fixed in a well-known manner to the end edges of the walls 6, 7 and 8 by bolts $9^d$.

3', 4', indicate handles, connected in any well known manner to the plates $9^c$ for the respective mold members 3, 4, whereby the latter can be conveniently moved to and from the operative position.

Figures 1, 4:
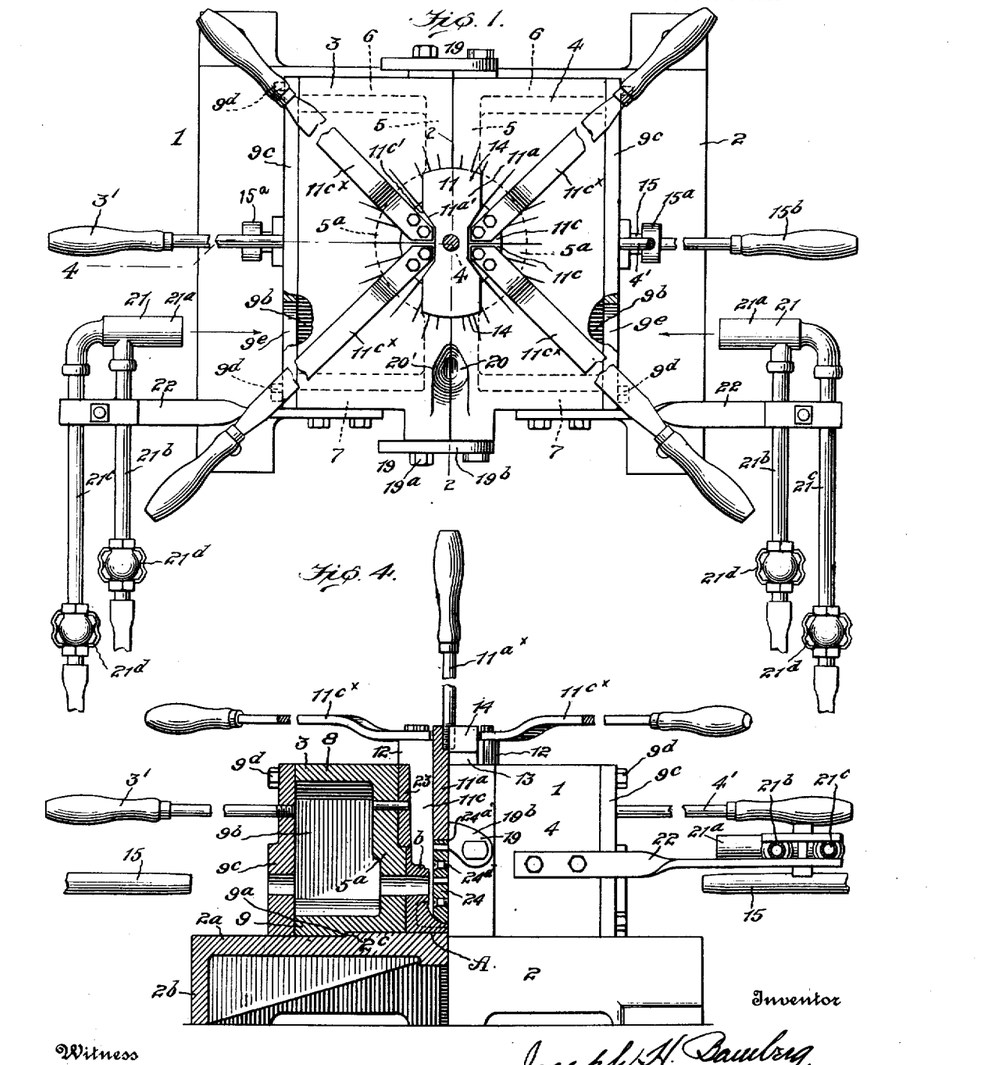
Figure 1 is a plan view of a mold suitable for use in carrying out my improved process, parts being broken away.
Fig. 4 is a side elevation of the mold, part of the view being in section on the line 4—4 of Fig. 1, showing the core pins removed.

The wall 5 of the mold member 3 is adapted to engage with the wall 5 of the member 4 when said members are moved together, as shown in Fig. 1. The wall 5 of each mold member 3, 4, is provided between its ends with a semi-circular portion $5^a$ which in coöperation with the similar semi-circular portion of the other mold member, and the surfaced portion of the base plate $2^a$, forms the outer wall of the mold cavity A. The wall 5 is, in the preferred form of the invention, relatively thick in order that it may be capable of retaining sufficient heat to make the mold efficient for casting pistons or other cup-shaped articles from various metals and alloys, such as aluminum alloys.

At $2^c$, the base plate $2^a$ is provided with an annular shoulder and the bottom walls 9 of the mold members 3, 4, are recessed at $9^a$ to receive the shoulder $2^c$, whereby the mold members 3, 4, are properly alined relatively to each other and also centered on the base plate $2^a$ when moved together, as shown in Fig. 1.

10 indicates auxiliary devices for alining and centering the mold members 3, 4. The auxiliary devices 10 may be used in connection with and auxiliary to the devices $2^c$ and $9^a$, or as a substitute therefor. The auxiliary devices 10 preferably comprise a pair of upwardly projecting stationary pins $10^a$ arranged near opposite sides of the base plate $2^a$ and recesses $10^b$ formed in the opposing faces of the walls 5 of the mold members 3, 4. The pins $10^a$ and recesses $10^b$ coöperate to cause the positioning of the mold members 3, 4, at a predetermined position each time they are moved together, it being necessary to so position the members 3, 4, that their recesses $10^b$ will receive the pins $10^a$ to bring them face to face to form the mold cavity A.

11 indicates as an entirety a permanent sectional core adapted to removably fit within the mold cavity A. The sides of the core may be slightly tapering to facilitate its removal.

Figure 10:
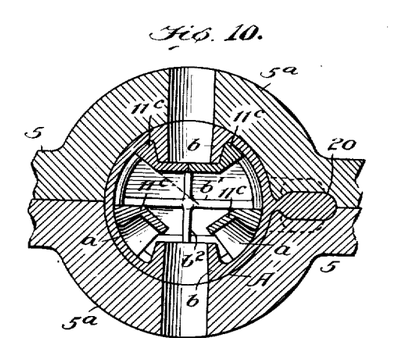
Fig. 10 is a horizontal sectional view on the line 10—10 of Fig. 3, showing the center core section removed and two of the side core sections swung laterally to illustrate the manner of freeing the same for removal.
Figure 12:
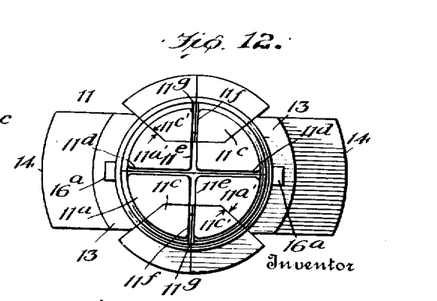
Fig. 12 is a bottom plan view of the assembled core.
Figure 13:
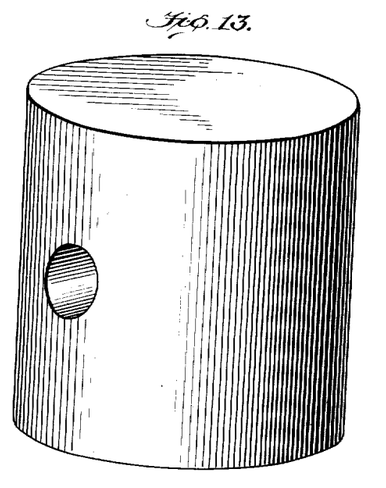
Fig. 13 is a perspective view of a skirted or cup-shaped piston, after the sprue has been removed.
Figure 14:
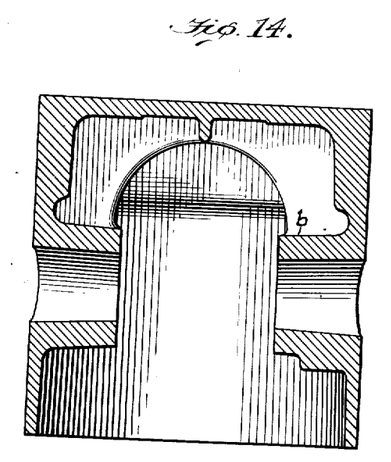
Fig. 14 is a transverse sectional view through the piston.
Figure 15:
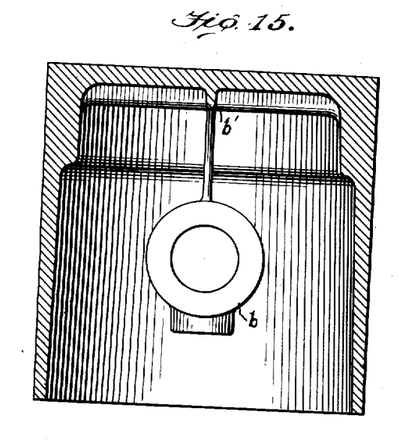
Fig. 15 is a transverse section of the piston taken at right angles to the section shown in Fig. 14.
Figure 16:
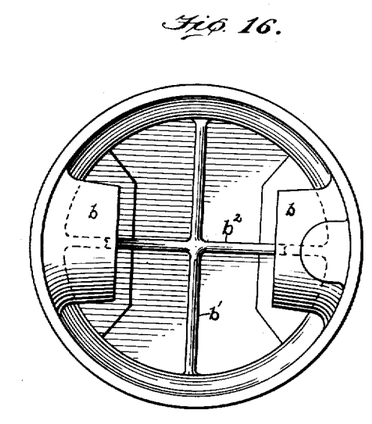
Fig. 16 is a bottom plan view of the piston.

The core 11 preferably comprises a plurality of parts made of steel, though other suitable material may be used; in the illustrated example it consists of a main or center section $11^a$ having curvilinear end walls $11^b$, and pairs of segmental sections $11^c$ arranged at opposite sides of the center section $11^a$. Each section of each pair of side core sections $11^c$ at either side of the center section is bodily laterally movable after the center section $11^a$ has been removed, as illustrated in Fig. 10, to permit its disengagement from inwardly projecting parts on the casting prior to its endwise or axial movement upwardly for withdrawal purposes. Each core section $11^a$, $11^c$, may be provided with a handle $11^{ax}$, $11^{cx}$, respectively, to facilitate handling thereof in assembling and disassembling the core.

Figures 9, 11:
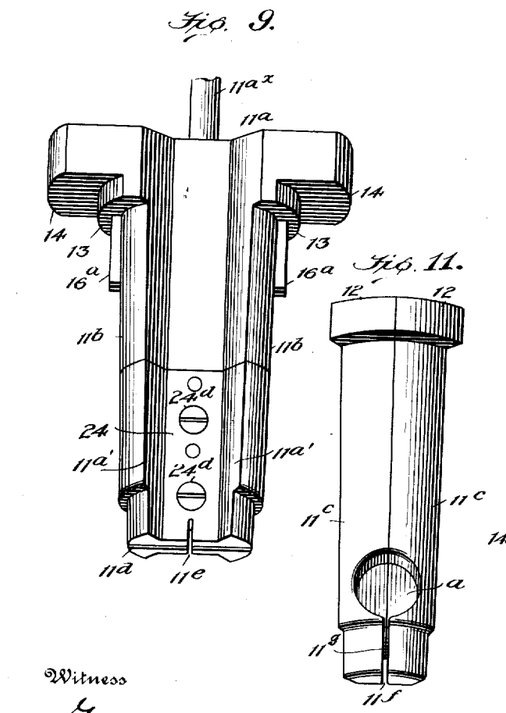
Fig. 9 is a perspective view of the main core section.
Fig. 11 is a perspective view of two side sections of the core.

The construction of the core in sections, as herein disclosed, provides for the easy and rapid removal of the sections where the casting has inwardly extending tubular or hollow bosses, ribs or other inwardly projecting members, desired for any purpose. As shown in Fig. 11, the cavity $a$ for each wrist pin boss is formed in the adjacent side core sections $11^c$, one-half of the cavity being formed in each section by cutting away a portion of the core section wall. As will be understood, this construction permits these sections $11^c$ to be swung away from each other in order to move their lower ends from beneath the adjacent boss of the casting in the mold cavity, and to do this, where inwardly extending ribs are carried by the casting, without defacing or mutilating such ribs.

In the form of construction shown, I have made provision for two heat dissipating ribs which extend across the inner face of the piston head preferably at right angles to each other. Such ribs may also be used for strengthening purposes. One rib is provided for on the casting by a groove $11^d$ formed in and extending longitudinally of the lower end of the center core section 11ᵃ; the other rib is provided by a groove 11ᵉ formed in the lower end of the center section 11ᵃ and extending transversely to the groove 11ᵈ and by recesses 11ᶠ which aline with the groove 11ᵉ and are formed in the opposing faces between and adjacent to the lower ends of each pair of side core sections 11ᶜ. Where it is desired to have the transverse rib extend upwardly to the bosses, as shown in the drawings, the opposing faces of the side core sections may be cut away as indicated at 11ᵍ.

In Fig. 10 I have shown a circle of substantially the diameter of the thickness of the inwardly extending ribs or webs. The walls of the core sections 11ᶜ which extend toward this circle are preferably formed on lines tangential to the circle, as are also the walls of the section 11ᵃ which engage therewith. This construction insures that when the sections 11ᶜ are swung bodily to remove them from the adjacent boss b their lower ends will practically engage flat with the side of the rib or web toward which they are moved rather than make a point engagement therewith. The purpose of this construction is two fold; first, it permits of maximum lateral swinging movement of the side core sections to facilitate their withdrawal from a casting in the mold; second, in the event any molten metal flows in between the opposing faces and forms a fin (which may happen if the sections do not fit tightly together or become worn) the fin is caused to project from the inner face of the casting at substantially right angles to a plane extending tangentially of the casting at the point of union of the fin therewith. When so disposed the fin may be broken or sheared off without injury to the adjacent walls of the casting; whereas I have found in practice that fins extending in other directions away from the inner face of the casting due to the construction of the core sections and disposition of their opposing or engaging faces, have a stronger union on one side of the fin with the adjacent wall of the casting than on the other, so that when such a fin is removed by breaking or shearing it off, it will carry with it portions of the metal forming the casting wall to which it was most strongly connected instead of making a clean break or shear. Under such circumstances the removal of the fin will materially damage the casting.

In carrying out this feature of my invention, it will be noted that the opposite side faces of the center section 11ᵃ are provided with walls 11ᵃ′ which extend in a direction approximately radially of the axis of the core and that the opposite side walls 11ᶜ′ of each side core section are shaped to fit against each other and the walls 11ᵃ′, respectively.

Figure 8:
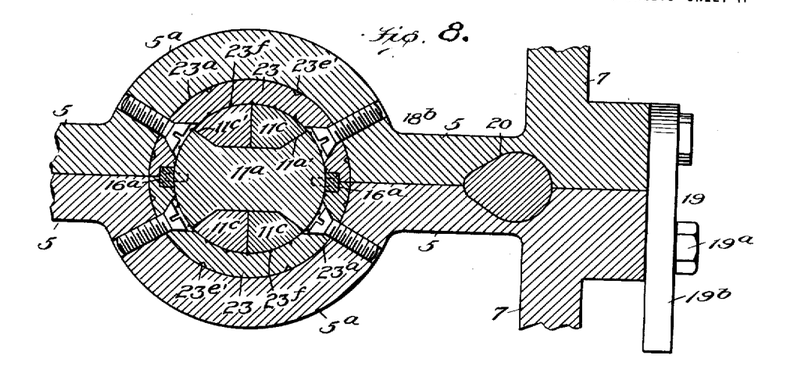
Fig. 8 is a horizontal section on the line 8—8 of Fig. 3.

12 indicates devices for swingably supporting the side core sections 11ᶜ on the mold members 3, 4. These devices preferably comprise flanges, one for each section, extending around the outer edges thereof. When the core sections 11ᶜ are assembled in the mold cavity A, the flanges 12 engage the top walls 8. As the latter are flat, they permit the flanges 12 to slide thereon when the sections 11ᶜ are swung laterally as shown in Fig. 8, and thus guide the sections 11ᶜ bodily laterally.

13 indicates devices preferably flanges, secured to or formed integrally with the center section 11ᵃ. These flanges extend around the curved end walls 11ᵇ of the core sections 11ᵃ and rest upon the top walls 8 to support the said section in proper position.

14 indicates projecting members carried by and preferably formed integrally with the main or center core section 11ᵃ. The members 14 are arranged above the flanges 13 and extend beyond their free edges so as to leave a space between each projecting member and the adjacent top wall 8. In actual practice, the core sections 11ᵃ, 11ᶜ, are usually wedged together very tightly within the mold opening above the cavity A. The purpose of this construction is therefore to provide devices with which a tool or lever may be engaged to pry out the core section. I prefer to provide a projecting member 14 at either curved end of the core section 11ᵃ.

15 indicates a pair of permanent core sections or core pins arranged to project into the mold cavity A to form openings in or through the bosses formed by the cavities a in the core sections 11ᶜ. The core pins 15 preferably comprise rods, each of which extends through a pair of alined openings formed in a wall 5ᵃ and adjacent plate 9ᶜ. At their inner ends the rods preferably engage the core sections 11ᶜ to limit their inward movement when positioned as shown in Fig. 1. Near their inner ends, the core pins 15 may be slightly tapered to permit ready removal and disengagement from the casting. 15ᵃ indicates a collar fixed in any suitable manner to each rod 15. The collar 15ᵃ is spaced from the adjacent plate 9ᶜ to permit the use of a prying tool to be used to force the rod outwardly and remove it when necessary. Each rod 15 is provided on its outer end with a handle 15ᵇ of any suitable form.

Figure 3:
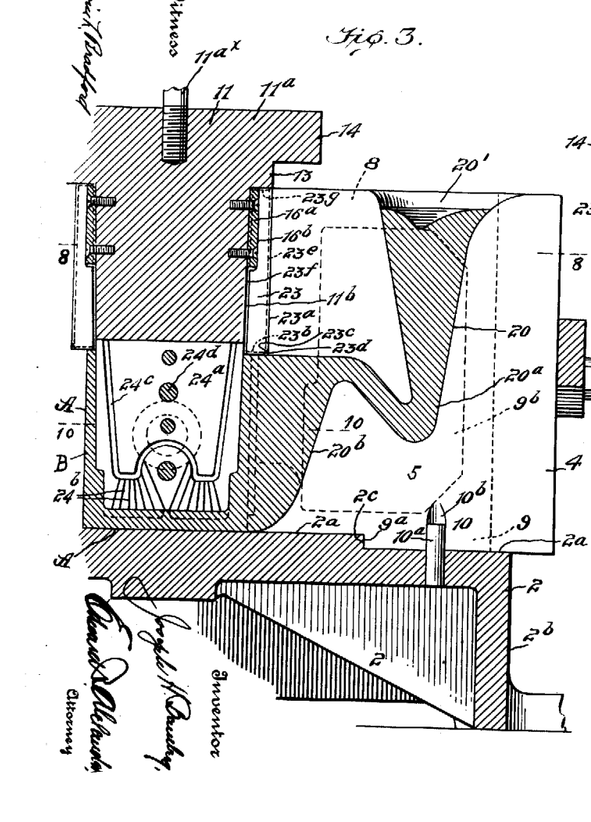

16 indicates devices which coöperate to aline the core 11 relative to the opening in or between the mold members 3, 4, so that the inner and outer walls constituting the cavity A will be properly correlated to form the desired castings. The alining devices preferably comprise a key or rib 16ᵃ fixed to and extending longitudinally of the core section 11ᵃ and a groove 16ᵇ formed in the walls of the opening through which the core 11 is moved. The key 16ᵃ may be connected to the core section 11ᵃ by countersunk screws, as shown in Fig. 3. The groove 16ᵇ may be formed by cutting away the adjoining faces of the walls 5ᵃ, said faces, in the construction shown, being formed by bushing members 23 which will be later described.

19 indicates devices for locking the mold members together so that they may be held in rigid relationship while casting takes place. I may provide a set of locking devices at either side of the mold. Preferably, each set of devices 19 comprises a lug or projection 19ᵃ, fixed in any suitable manner to one of the mold members, such as the member 3, and a member 19ᵇ pivotally mounted on the other mold member and swingable into latching engagement with the lug 19ᵃ. The member 19ᵇ carries a hook or arm which engages the pin 19ᵃ. The pivoted member is adapted to be driven downwardly against the pin 19ᵃ and the pin engaging face of the arm is wedge shaped, so that when the member 19ᵇ is struck with a hammer or equivalent tool, the inclined face will serve to force the mold members 3, 4, tightly together and maintain them in such position.

In operation, the walls of the mold, including core parts, which constitute the walls for the mold cavity are suitably coated or treated in any well known manner to reduce as much as possible agitation of the molten metal as it flows into contact therewith and to insure proper setting of the metal within the mold cavity. The mold members 3, 4, are usually moved together, then the locking devices 19 are moved into operative position ready to be driven or forced into latched position and the pairs of side sections and the center of the core 11 are assembled in the mold, after which the members 19ᵇ are hammered to draw and lock the mold members together. The core sections 15, 15 are then introduced into place.

20 indicates the gate for the mold; it may be of any desired form. The gate is preferably formed by cutting away the adjoining faces of the opposing walls 5, so that when the members 3, 4, are assembled together the cutaway portions form a gate of the desired shape. The shape and construction of the gate 20 herein shown for illustrative purposes I believe to be the sole invention of A. B. Norton, of Detroit, Mich. As such invention will form the subject-matter of a separate application, further description of the gate herein will not be necessary.

Where the character of the castings, the mold parts and the metal poured, or either thereof, make it necessary or desirable to heat the mold in carrying out the casting operation, I provide means, indicated as an entirety at 21, for heating the mold parts or walls to and keeping them at the desired temperatures. The heating means 21 may comprise suitable burners 21ᵃ to which are connected gas and air supply pipes 21ᵇ, 21ᶜ, respectively. Each supply pipe has a flexible connection and is provided with a valve 21ᵈ of any suitable construction. The open or free end of the burner 21ᵃ is preferably spaced from the adjoining mold member but is arranged to project the flame into and through an opening 9ᵉ formed in the adjacent plate 9ᶜ, whereby it may impinge against the wall 5 within the chamber 9ᵇ. I have for illustrative purposes shown heating means 21 for each mold member 3, 4, and so arranged that the flame will impinge directly on the portions of the adjacent wall 5 in which the gate 20 is formed. As a result of this construction, the metal flowing through the gate 20 to the mold cavity A will be kept from premature setting.

22 indicates a bracket for supporting each heating means 21. The bracket is fixed in a well known manner to one wall of the adjacent mold member, such as the wall 7. Being connected to and movable with the mold members, the brackets maintain the burners 21ᵃ in fixed relationship to the mold members and thus permit the latter to be operated in carrying out the casting operations.

I provide improved means for venting the mold cavity A to permit the ready escape of air or gases as the molten metal flows into the cavity and to effect the run of the metal to all parts of the cavity. The sectionality of the mold structure lends itself admirably to the carrying out of this feature of the construction, since it permits the mold cavity to be vented without regard to the shape and construction of the casting.

I have chosen to illustrate two different examples of venting means. One of these examples is shown in Figs. 2, 3, 6 and 8. Referring to these figures, 23 indicates an insert and 23ᵃ indicates a recess formed in the wall 5ᵃ of each mold member 3, 4, to receive an insert 23. The inserts 23 are mounted above the mold cavity A in the opening formed by the semi-circular walls 5ᵃ. They are of curvilinear shape and, as shown, form the upper walls of the opening through which the sections of the core 11 are inserted into and removed from the mold cavity A. The inserts are preferably arranged to project inwardly beyond the outer wall of the cavity A (see Fig. 3), whereby their lower ends form the upper end walls for said cavity. 23ᵇ indicates a plurality of grooves formed on the lower ends of the inserts. These grooves may extend in a direction radial relative to the axis of the mold cavity. The grooves 23ᵇ are preferably etched or otherwise formed in the surface of the insert so that they will be small enough to preclude molten material from flowing through them but large enough to permit the free escape of air or gases from the mold cavity A. At 23ᶜ the lower outer corners of the inserts 23 are cut or beveled away to form in coöperation with the walls of the recess 23ᵃ a channel 23ᵈ into which the outer ends of the grooves 23ᵇ lead. 23ᵉ indicates recesses or grooves formed in the outer surfaces of the inserts 23. The recesses 23ᵉ extend from end to end of the inserts and in coöperation with the adjacent walls of the recesses 23ᵃ form outlets or vents leading from the channel 23ᵈ to the outside atmosphere.

Figure 5:
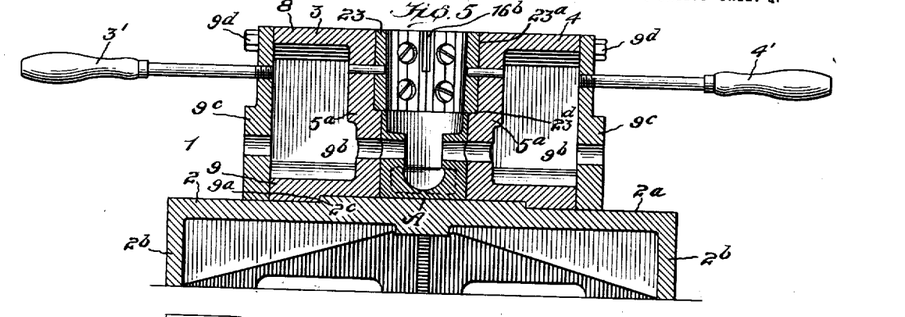
Fig. 5 is a sectional view of the mold with the core removed.

23ᶠ indicates air escape grooves which may be formed on the inner surfaces of the inserts 23. The grooves 23ᶠ are connected at their upper ends with grooves 23ᵍ formed in the upper end walls of the inserts 23. The grooves 23ᵍ permit the escape of the air or gases from the recesses 23ᶠ which might otherwise be prevented by the flanges 12, 13, on the core sections 11ᵃ, 11ᶜ, respectively, when the latter are in position. It will be noted that the vents 23ᵇ and 23ᶠ lead from the upper outer and inner corners of the cavity A. This construction permits air and other gases to escape from both of these points as the metal is poured, and insures that the metal will run into and completely fill the cavity and form a casting of the desired shape. The inserts 23 may be fixed in the recesses 23ᵃ in any suitable manner, preferably by screws, the heads of which are countersunk as shown in Fig. 5.

Figure 2:
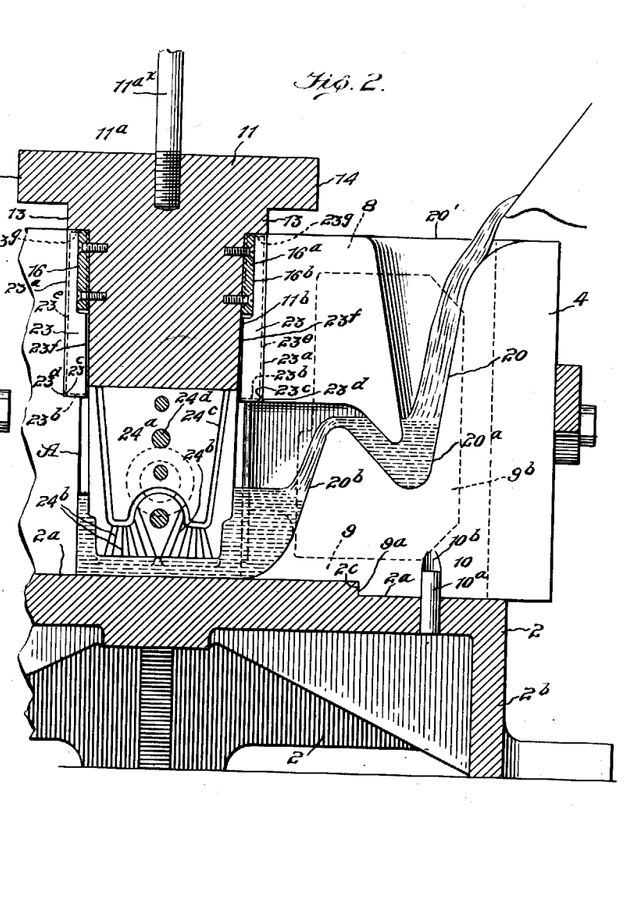
Figs. 2 and 3 are fragmentary sections on the line 2—2 of Fig. 1, the former showing the metal partly poured and the latter showing the casting completely poured.
Figure 6:
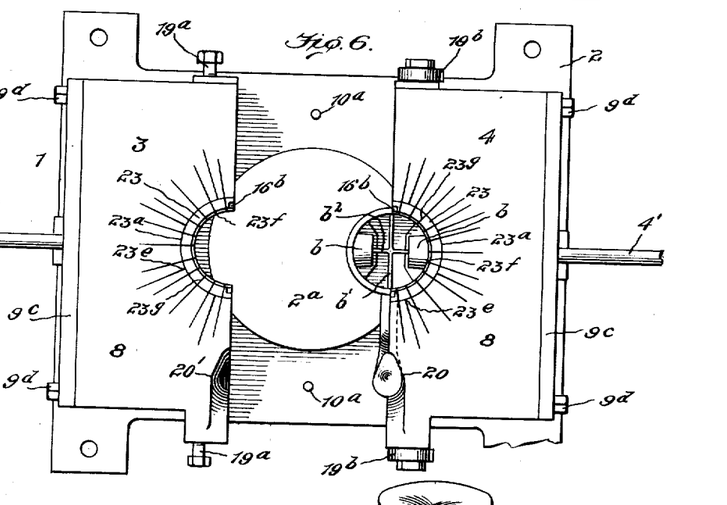
Fig. 6 is a top plan view of the mold with the mold members separated and the casting secured to one of them.
Figure 7:
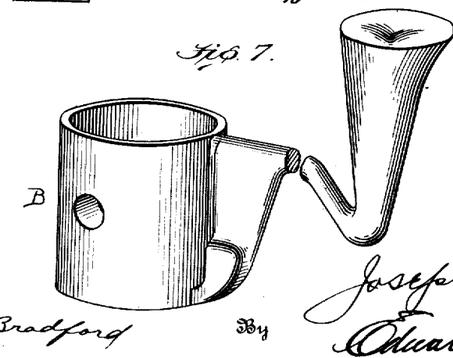
Fig. 7 is a perspective view of the casting, after it is removed from the mold, showing detached that part of the sprue which is immediately broken off as the casting is removed from the mold.

Another form of venting is shown in Figs. 2, 3 and 6. By this latter form, I illustrate means for venting a cavity formed in a core section or sections. In these figures, 24 indicates an insert which fits into a recess or cutaway portion 24ᵃ in the main core section 11ᵃ. This insert is of a size and shape to complete the core section, as will be readily understood from Fig. 9. On the face of the lower end of the main core section 11ᵃ, opposing the inner wall of the insert 24 are formed a plurality of fine grooves 24ᵇ to permit the escape of air or gases from the cavities 11ᵈ and 11ᵉ and to insure the formation of the inwardly extending ribs on the casting. The grooves 24ᵇ lead to a conduit 24ᶜ preferably formed by coöperating grooves in adjoining faces of the insert 24 and center section 11ᵃ, through which conduit the air and gases escape to lateral passageways 24ᵃ′ (see Fig. 4) between the upper end of the insert and adjacent shoulder of the center section 11ᵃ formed by chamfering or beveling the upper inner edge of the insert 24. The passageways communicate at their outer ends with the vents 23ᶠ.

The insert 24 is preferably fixed to the adjacent portion of the core section 11ᵃ by screws 24ᵈ.

Assuming that the burners 21 have been operated to heat up the parts of the mold to the desired temperature and that the mold complete, including core sections, is assembled, as illustrated in Fig. 1, the molten metal to be cast is brought to the mold in any suitable manner, as by a ladle and is poured into the inlet port 20′ of the gate 20. It descends through the gate and enters the mold cavity A. I prefer to use a gate 20 such as illustrated in the drawings because of the peculiar advantages which it possesses in connection with the casting of a cup-shaped article having inwardly extending bosses and ribs or either of them. The construction of the gate is such that a liquid seal is formed at 20ᵃ as the metal flows through the gate. This seal after it is formed tends to preclude the passage of air and gases, and also oxids and other foreign materials, into the mold cavity A and also to materially reduce splashing of the metal within the gate during the pouring. Splashing further is substantially eliminated by forming the wall 20ᵇ in such way that the metal flows smoothly along it and thence into the cavity A. Air and gases within the mold cavity escape in the well-known manner through the vents provided as hereinbefore described. The metal rises from the bottom of the mold cavity upwardly until it engages with the lower end of the inserts 23, when the casting B is completed, having in this example two inwardly extending tubular bosses, $b$, $b$, and two inwardly extending ribs $b^1$, $b^2$, disposed at right angles to each other. The weight of the metal in the upper portion of the gate serves to force the metal into the mold cavity to complete the casting, the upper end wall of the casting being substantially in line with the upper portion of the gate which directly feeds it. By reason of the chilling effect of the molten metal of the cavity walls, the arrangement of the feeder section of the gate in relation to the mold cavity, the relatively large volume of the said feeder section and the relatively small volume of the passage between it and the mold cavity, and the maintaining of a relatively high temperature of the metal in the gate, the metal in the cavity freezes progressively from points most remote from the gate toward the gate and finally in the gate itself, the molten metal in the gate being thus drawn upon to make up for crystallization shrinkage of the metal in the mold cavity. This result, which is of great importance in securing sound castings is the more effectively and reliably attained by reason of the presence of the eutectic uniformly distributed through the alloy and acting, by virtue of its low freezing point, to maintain communication between the molten metal in the gate and points remote therefrom in the mold cavity until metal at said points has frozen. After the pouring, I preferably next remove the core sections 15, 15, by pulling endwise each of them out of the mold, or at least out of engagement with any part of the casting. Next, preferably, I ease off the locking devices somewhat and remove the main or center section 11ª of the core by withdrawing it axially or longitudinally upward and away from the rest of the mold. Then by grasping the handles 11ᶜˣ I move bodily laterally each of the core sections 11ᶜ so as to free it from alinement with any part of the adjacent casting boss $b$, see Fig. 10, and then withdraw each of the said core sections 11ᶜ axially or longitudinally from the mold. Then the mold sections 3, 4, are unlatched and moved away from each other a sufficient distance to permit the casting to be withdrawn therefrom, whereupon they are again moved into engagement with each other, latched and the operation repeated.

The temperature of the parts 3, 4, may be maintained at about 800 degrees Fahrenheit and that of the core pins 15 at about 300 degrees Fahrenheit. The main core section may be maintained at slightly lower temperatures than the mold parts 3, 4, and the walls surrounding the gate 20 may be maintained even above 800 degrees Fahrenheit where desired, to insure that the metal in the gate will remain in liquid condition longer than that in the mold cavity. In this connection it is desirable that the passage leading from the upright feeder section of the gate to the mold cavity should be short and narrow as indicated in Fig. 10, as this helps to insure the above described progressive freezing of the metal, first in the mold cavity, then in the said passage and last in the gate.

I have already set forth the internal structural characteristics of the castings produced by my improved process, and I may now add that where the period of time that a casting of the character to which my invention relates, remains in the mold is a factor in the production of a casting having the desired internal structure, my improved process will be found to be of large advantage in enabling the operator or operators to produce one after the other in rapid succession castings which have been permitted to remain in the mold a prescribed time and having a given time-temperature treatment in the process of making.

Inasmuch as a eutectic is a conglomerate, that is, a physical mixture of two or more metallographic constituents, the excess substance will be of the same composition as one constituent of the eutectic. There is therefore, a tendency for the excess substance to absorb the like constituent from the eutectic. This is especially true where the excess substance exists in a comparatively large quantity and where the eutectic exists in a comparatively small quantity. It sometimes happens that some or even practically all of one constituent of a eutectic is absorbed by the excess substance, leaving the remaining constituent or constituents of the eutectic isolated but occupying the position that would otherwise be occupied by the eutectic. It also frequently happens in the case of aluminum rich alloys containing copper, that material not true eutectic but occupying the position of the eutectic, is in greater quantity than the true eutectic. This is brought about by rapid solidification of the metal with concentration of the low melting point mixtures, including mixtures other than true eutectic, toward the surfaces of the grains of excess substance as cooling and solidification proceed. After the metal has become completely solid, if its temperature is held immediately below the freezing point for some time, a readjustment by diffusion will occur in the composition of the metal and the extra low melting point metal at the surfaces of the grains of excess substance, that is, in the place normally occupied by the eutectic, will be absorbed into the excess substance itself. But with rapid cooling, time may not be given immediately below the freezing point for this readjustment by diffusion and consequently some of the low melting point portion will be trapped in the position of the eutectic and it is difficult to distinguish this from true eutectic. The position occupied by the eutectic around the grains of excess substance, especially when it is present in an alloy in any such proportion as has been specified herein, gives it the appearance in section of a net-work. And as a eutectic which has been robbed of more or less of a constituent or a eutectic which has been supplemented by other low melting point metal, retains the same net-work form and distribution characteristic of eutectic, in dealing with metallographic structures, metallurgists now commonly designate the said net-work formation as eutectic whether it be true eutectic or eutectic that has been robbed of a constituent or eutectic that has been supplemented by other low melting mixtures. Therefore, when I refer herein to eutectic it is to be understood that I use the term in this broad sense.

I appreciate the fact that my inventions herein disclosed probably constitute subjects-matter for different applications for Letters Patent, and accordingly of even date herewith I have executed and filed an application relating to my improved apparatus herein disclosed. (See application Ser. No.

82,528, filed March 7, 1916.) It is also noted that the claims in the present application relating to the piston castings themselves cover castings formed of one only of the groups of alloys herein disclosed, castings formed of other disclosed alloys being claimed in my divisional applications, Serial No. 151,777, filed March 1, 1917, Serial No. 152,896, filed March 6, 1917 and Serial No. 153,406, filed March 8, 1917.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. The process of making internal combustion motor piston castings, which consist in bringing a molten metallic alloy, of relatively low specific gravity and high crystallization shrinkage and coefficient of heat conductivity and in which a eutectic will exist after final freezing, against chilling surfaces constituting the walls of a mold cavity of the desired piston shape, and causing progressive setting of the casting accompanied at all times by compensation with molten metal for crystallization shrinkage and complete solidification with the eutectic substantially surrounding the excess substance of the metallic alloy.

2. The process of making internal combustion motor piston castings, which consists in bringing a molten metallic alloy, of relatively low specific gravity and high crystallization shrinkage and coefficient of heat conductivity and in which a eutectic will exist after final freezing, against chilling surfaces constituting the walls of a mold cavity of the desired piston shape, and causing progressive setting of the casting to take place from points relatively remote from those at which the molten metal enters the mold cavity, accompanied at all times by compensation with molten metal for crystallization shrinkage and complete solidification with the eutectic substantially surrounding the excess substance of the metallic alloy.

3. The process of making internal combustion motor piston castings, which consists in pouring a molten aluminum alloy containing copper, iron and magnesium, or any of them, under the action of gravity, against chilling surfaces arranged to give the desired shape to the casting, and causing the setting of the metal in the casting to take place progressively with the liquid metal in the casting at all times in communication with the necessary volume of additional liquid metal to compensate for crystallization shrinkage in the casting and with the eutectic substantially surrounding the excess material when the casting is solidified.

4. The process of making internal combustion motor piston castings, which consists in bringing a molten metallic alloy having relatively low specific gravity and relatively high coefficient of heat conductivity against chilling surfaces disposed to form a piston casting having hollow wrist pin bosses, removing the chilling surfaces which extend into the wrist pin bosses, then removing the chilling surfaces for the remaining inner walls of the casting, and then removing the casting therefrom.

5. The process of making internal combustion motor piston castings, which consists in bringing a molten metallic alloy having a relatively low specific gravity and a relatively high coefficient of heat conductivity against chilling surfaces shaped to form a skirted piston casting having hollow wrist pin bosses, the chilling walls for shaping the holes through the wrist pin bosses being maintained at a lower temperature than the other chilling walls for the mold cavity, then removing the chilling walls for the wrist pin bosses, then removing the other walls for the interior of the piston casting, and then removing the casting.

6. The process of making internal combustion motor skirted piston castings in a mold comprising outer walls and inner walls formed by a plurality of elongated removable main core sections shaped and disposed to determine the thickness of the walls of the casting and to form internally extending wrist pin bosses, together with elongated removable core sections for the wrist pin bosses, said process consisting in introducing a molten metallic alloy having a low specific gravity and a high coefficient of heat conductivity into the mold cavity, then removing the core sections of the wrist pin bosses, then removing one of the main core sections not engaging the internal wrist pin bosses by withdrawing it longitudinally parallel to the axis of the mold cavity, then withdrawing the main core sections engaging the internal wrist pin bosses by moving them laterally to free them from the wrist pin bosses and then longitudinally along the axis of the mold cavity, and then withdrawing the casting.

7. The process of making skirted piston castings having internally extending hollow wrist pin bosses, which consists in positioning within the cavity of a permanent mold body permanent side core sections having recesses in which are formed the internally extending wrist pin bosses, sliding a permanent central core section between said side core sections to properly position the latter and complete the main core, inserting permanent core pins in the said recesses in the side core sections, then introducing molten metal into the mold cavity thus formed, then removing the core pins for the wrist pin bosses, then removing the center section of the main core by withdrawing it along the axis of the mold cavity, then moving each side core section bodily laterally within the casting and then drawing it outwardly along the axis of the mold cavity, and then removing the casting.

8. The process of making skirted piston castings having internally extending hollow wrist pin bosses, which consists in positioning within the cavity of a permanent mold body permanent side core sections having recesses in which are formed the internally extending wrist pin bosses, sliding a permanent central core section between said side core sections to properly position the latter and complete the main core, inserting permanent core pins in the said recesses in the side core sections, maintaining said core pins at a relatively lower temperature than the other walls of the mold cavity, then introducing molten metal into the mold cavity thus formed, then removing the core pins for the wrist pin bosses, then removing the center section of the main core by withdrawing it along the axis of the mold cavity, then moving each side core section bodily laterally within the casting and then drawing it outwardly along the axis of the mold cavity, and then removing the casting.

9. The process of making skirted piston castings for internal combustion motors which consists in causing molten metallic alloy in which a eutectic will exist after final freezing and which alloy has a relatively low specific gravity and a relatively high crystallization shrinkage and coefficient of heat conductivity, to flow under the action of gravity into a mold cavity, the walls of which are constituted of metal maintained at a chilling temperature as compared with the temperature of the molten alloy, causing progressive setting of the casting in the presence of a surplus of molten alloy which is drawn upon to compensate for and fill up cavities due to crystallization shrinkage, causing solidification of the casting to be effected with the eutectic substantially surrounding the excess substance, and then freeing the casting from the walls constituting the mold cavity.

10. The process of making an internal combustion motor piston casting which consists in disposing chilling walls to provide a mold cavity shaped to form a skirted piston casting having wrist pin bosses, causing a molten metallic alloy having a relatively low specific gravity and a relatively high crystallization shrinkage and coefficient of heat conductivity to enter said mold cavity under the action of gravity at a point substantially equidistant from the recesses in the cavity for the wrist pin bosses and to flow in opposite directions to fill said cavity, causing the progressive setting of said casting and at the same time maintaining a surplus of molten alloy in communication with the liquid metal in the casting to compensate for shrinkage therein due to crystallization, and then freeing the casting from the chilling walls constituting the mold cavity.

11. The process of making an internal combustion motor piston casting which consists in disposing chilling walls to provide a mold cavity shaped to form a skirted piston casting having wrist pin bosses, causing a molten alloy having a high crystallization shrinkage and in which a relatively small amount of eutectic will exist after final freezing to enter under the influence of gravity said mold cavity intermediate the wrist pin boss recesses therein and to flow in opposite directions to fill said recesses and cavity, and causing freezing of the metal in the mold cavity to take place substantially without the formation of cavities due to crystallization shrinkage and in such manner that in the resulting structure the eutectic will substantially surround the excess material.

12. The process of making internal combustion motor skirted piston castings in a mold comprising outer walls and inner walls formed by a plurality of elongated removable main core sections shaped and disposed to determine the thickness of the walls of the casting and to form internally extending projections including wrist pin bosses on the side walls of said casting, together with elongated movable core sections for the wrist pin bosses, said process consisting in introducing a molten metallic alloy having a low specific gravity and a high co-efficient of heat conductivity into the mold cavity, then removing the core sections of the wrist pin bosses, then removing one of the main core sections free for longitudinal movement parallel to the axis of the mold cavity, then withdrawing the remaining core sections by moving them first laterally to free them from said internal projections and then longitudinally of the axis of the mold cavity, and then withdrawing the casting.

13. As a new article of manufacture, an internal combustion motor piston casting made of a metallic alloy in which exists a eutectic, said alloy having a relatively low specific gravity and a relatively high crystallization shrinkage and coefficient of heat conductivity and the casting being fine grained and substantially without cavities due to crystallization shrinkage and having the eutectic substantially surrounding the excess substance.

14. As a new article of manufacture, an internal combustion motor piston casting made of a metallic alloy in which a relatively small volume of eutectic exists after freezing and substantially surrounds the excess substance and which alloy has a relatively low specific gravity and a relatively high crystallization shrinkage and coefficient of heat conductivity, the structure of the casting being substantially free from cavities due to crystallization shrinkage and relatively fine-grained.

15. As a new article of manufacture, an internal combustion motor piston casting made of an alloy consisting predominantly of aluminum and containing other elements such as magnesium, copper, and iron, in proportions to produce a relatively small quantity of eutectic in the casting after freezing, the casting having the said eutectic substantially surrounding the excess substance therein and being fine grained and substantially free from porosity due to crystallization shrinkage.

16. As a new article of manufacture, an internal combustion motor piston casting made of any alloy consisting predominantly of aluminum and containing other elements such as magnesium, copper, and iron, in proportions to produce a relatively small quantity of eutectic in the casting after freezing, said casting having the said eutectic substantially surrounding the excess substance therein and being fine grained and substantially free from cavities due to crystallization shrinkage and entrapped air and other gases.

17. As a new article of manufacture, an internal combustion motor piston casting made of an alloy consisting predominantly of aluminum with its component parts selected and proportioned to produce a relatively small quantity of eutectic in the casting after freezing, the casting having the said eutectic substantially surrounding the excess substance therein and being fine grained and substantially free from porosity due to crystallization shrinkage.

18. As a new article of manufacture, an internal combustion motor piston casting made of an alloy consisting predominantly of aluminum with its component parts selected and proportioned to produce a relatively small quantity of eutectic in the casting after freezing, the casting having the said eutectic substantially surrounding the excess substance therein and being fine grained and substantially free from cavities due to crystallization shrinkage and entrapped air and other gases.

19. As a new article of manufacture, an internal combustion motor piston casting made of a metallic alloy in which a relatively small volume of eutectic exists after freezing and substantially surrounds the excess substance, and which alloy has a relatively low specific gravity and a relatively high crystallization shrinkage and coefficient of heat conductivity, said casting being substantially free from cavities due to crystallization shrinkage and of relatively fine-grained structure resulting from setting or chilling of the alloy between chilling surfaces and under the gravity action of the metal poured to make the casting.

20. As a new article of manufacture, an internal combustion motor piston casting made of an alloy consisting predominantly of aluminum and containing copper, magnesium and iron, the casting having chilled walls and being fine grained and substantially free from porosity due to crystallization shrinkage.

21. As a new article of manufacture, an internal combustion motor piston casting made of an alloy consisting predominantly of aluminum and containing other elements such as copper, magnesium and iron, in proportions to produce a relatively small quantity of eutectic in the casting after freezing, the casting having the said eutectic substantially surrounding the excess substance therein and having chilled walls.

22. As a new article of manufacture, an internal combustion motor piston casting made of an alloy consisting predominantly of aluminum, the casting having chilled walls and being formed with inwardly extending integral hollow wrist pin bosses with internal walls chilled to a greater extent than other portions of the casting.

23. The process of making permanent mold castings of metallic alloys having high crystallization shrinkage which consists in so proportioning the constituent metals and so controlling the time and temperature factors in alloying and casting that on freezing the eutectic is in suitable quantity to substantially surround the excess substance, and in introducing the molten alloy into a mold cavity having walls of high heat conductivity in such manner that each point in the cavity is in communication with a supply of molten alloy during freezing at such point.

24. As a new article of manufacture, an internal combustion motor piston casting made of an alloy of low specific gravity and high co-efficient of heat conductivity, in comparison with iron, the casting having chilled outer walls and being formed with inwardly extending integral hollow wrist pin bosses with chilled internal walls.

25. As a new article of manufacture, an internal combustion motor piston casting made of an alloy of low specific gravity and high co-efficient of heat conductivity, in comparison with iron, the casting having chilled outer walls and being formed with inwardly extending integral hollow wrist pin bosses with internal walls chilled to a greater extent than other portions of the casting.

In testimony whereof I affix my signature, in the presence of two witnesses.

JOSEPH H. BAMBERG.

Witnesses:
　VERNON E. GARDNER,
　WM. R. LAIRD.